(12) United States Patent
Siebert et al.

(10) Patent No.: US 9,206,279 B2
(45) Date of Patent: Dec. 8, 2015

(54) HEAT-RESISTANT LASER-INSCRIBABLE FILM

(75) Inventors: Michael Siebert, Schenefeld (DE); Philipp Preuβ, Hamburg (DE); Jan Ellinger, Hamburg (DE); Klaus Keite-Telgenbüscher, Hamburg (DE); Stephan Zöllner, Buchholz/Nordheide (DE)

(73) Assignee: tesa SE, Norderstedt (DE)

( * ) Notice: Subject to any disclaimer, the term of this patent is extended or adjusted under 35 U.S.C. 154(b) by 486 days.

(21) Appl. No.: 13/563,021

(22) Filed: Jul. 31, 2012

(65) Prior Publication Data

US 2013/0040136 A1 Feb. 14, 2013

(30) Foreign Application Priority Data

Aug. 12, 2011 (DE) .......................... 10 2011 080 883

(51) Int. Cl.
| | | |
|---|---|---|
| *C08F 290/06* | (2006.01) | |
| *B41M 5/24* | (2006.01) | |
| *C08F 290/14* | (2006.01) | |
| *C09D 151/08* | (2006.01) | |

(52) U.S. Cl.
CPC .............. *C08F 290/061* (2013.01); *B41M 5/24* (2013.01); *C08F 290/067* (2013.01); *C08F 290/141* (2013.01); *C08F 290/147* (2013.01); *C09D 151/08* (2013.01); *Y10T 428/24802* (2015.01); *Y10T 428/24917* (2015.01); *Y10T 428/2848* (2015.01); *Y10T 428/31699* (2015.04); *Y10T 428/31855* (2015.04); *Y10T 428/31909* (2015.04)

(58) Field of Classification Search
CPC . B41M 5/24; B41M 5/245; Y10T 428/24802; Y10T 428/24917; Y10T 428/24934

USPC ........................ 428/195.1; 430/200
See application file for complete search history.

(56) References Cited

U.S. PATENT DOCUMENTS

| | | | | |
|---|---|---|---|---|
| 3,700,643 | A | * 10/1972 | Smith et al. | .................... 526/282 |
| 4,271,223 | A | * 6/1981 | Lambert et al. | ............... 428/207 |
| 5,891,942 | A | 4/1999 | Parish et al. | |
| 6,066,437 | A | * 5/2000 | Kosslinger | .................... 430/297 |
| 7,438,963 | B2 | 10/2008 | Koops et al. | |
| 2004/0209086 | A1 | 10/2004 | Koops et al. | |

FOREIGN PATENT DOCUMENTS

| | | |
|---|---|---|
| DE | 8130861.2 U1 | 11/1982 |
| DE | 19752224 A1 | 5/1998 |
| DE | 10048665 A1 | 4/2002 |
| DE | 10142638 A1 | 5/2003 |
| DE | 69833371 T2 | 11/2006 |
| EP | 0939109 B1 | 9/2003 |
| WO | WO 9850317 A1 | 11/1998 |
| WO | 03018700 A1 | 3/2003 |

OTHER PUBLICATIONS

European Search Report for related European Application No. EP 12178189.2 dated Nov. 26, 2012.
Chinese Office Action with English-language translation for related Chinese Application No. CN 201210284634.5 dated Jun. 4, 2015.

* cited by examiner

*Primary Examiner* — Gerard Higgins
(74) *Attorney, Agent, or Firm* — Norris McLaughlin & Marcus, P.A.

(57) ABSTRACT

Laser-inscribable film, comprising a contrast layer based on a cured acrylate coating composition and, arranged above the contrast layer, an engraving layer, where the cured acrylate coating composition is based on a composition comprising from 30 to 80% by weight of a trifunctional oligomer A, from 0 to 20% by weight of a trifunctional monomer B, from 1 to 30% by weight of a difunctional monomer C, and from 2 to 40% by weight of a colorant pigment.

5 Claims, No Drawings

HEAT-RESISTANT LASER-INSCRIBABLE FILM

The present invention relates to a laser-inscribable film comprising a contrast layer and an engraving layer arranged above the contrast layer, and also laser-inscribable labels produced from the film. The present invention further relates to a process for producing a laser-inscribable film, and also to acrylate coating compositions used in the production of the laser-inscribable film. The invention also comprises the use of the acrylate coating compositions described for producing films according to the invention.

The identification-marking of articles is increasingly important. By way of example, conventional printed labels in the automobile industry are being replaced by laser-inscribable labels. Laser-inscribable labels are being used to place information and indications such as tyre pressure or fuel type on various components of motor vehicles. Laser-inscribable labels may comprise not only indications of this type but also security information, for example chassis numbers and vehicle-identification numbers. In the case of theft or accident, appropriate labels permit tracing of a vehicle and of stages of manufacture during its production. The use of particular security features, such as holograms, or durable UV footprints, on the substrate on which the label has been adhesive-bonded, and targeted selection of material for the laser-inscribable labels firstly makes it more difficult to copy the material and secondly provides a warning of tampering attempts.

There are laser-inscribable labels known in the prior art which permit rapid inscription and high contrast of inscription and ensure high heat resistance over short periods. DE 81 30 861 U1 discloses multilayer labels which comprise a thin and a thick coating layer and withstand high temperatures over short periods. DE 100 48 665 A1 and DE 101 42 638 A1 describe laser-inscribable labels which likewise withstand high temperatures for short periods.

However, if labels of the prior art are subjected to temperature effects over a long period, shrinkage of one or more layers occurs. This shrinkage is believed to result from a change in the area dimension of one or more layers. The shrinkage of one or more layers within known labels is apparent in separation of the labels in the region of their edges. This separation poses a security problem per se for sensitive data such as chassis numbers, since it is possible that labels could be removed completely, without damage and without leaving any residue. Secondly, the shrinkage can cause stresses within the label if the expansion behaviour of various layers within a label differs, or chemical processes lead to shrinkage in the event of temperature rise within a layer. This can by way of example be a result of ageing processes, for example crosslinking reactions. If stresses of this type arise, cracking occurs within the labels, resulting firstly in failure to meet aesthetic requirements and secondly in the possibility that a tampering attempt could be incorrectly suspected.

In the light of increasingly stringent requirements relating to the heat resistance of laser-inscribable labels over prolonged periods, there is therefore a need for improved films to be used as starting material for appropriate laser-inscribable labels. None of the laser-inscribable labels or films known from the prior art complies entirely with the increasingly stringent requirements relating to tamper prevention and high heat resistance. In particular at high temperature, the known labels are subject to a loss of dimensional stability of one or more layers, which is apparent in shrinkage, and also to, associated therewith, edge-lift of the labels, and to cracking.

It is therefore an object of the present invention to provide improved laser-inscribable films which avoid the problems of the prior art and serve as starting material for producing dimensionally stable laser-inscribable labels. At the same time, the intention is to retain as far as possible, or improve, chemicals resistance in comparison with labels of the prior art. For these purposes, chemicals resistance is by way of example resistance to hydrocarbons, such as fuels for vehicles, and to solvents which could possibly come into contact with the labels.

The present invention solves the said problem by using a contrast layer based on a cured acrylate coating composition. The cured acrylate coating composition of laser-inscribable films according to the invention is based on a composition comprising from 30 to 80% by weight of a trifunctional oligomer A, from 0 to 20% by weight of a trifunctional monomer B, from 1 to 30% by weight of a difunctional monomer C, and from 2 to 40% by weight of a colorant pigment. In one preferred embodiment of the present invention the composition on which the acrylate coating composition is based comprises from 50 to 60% by weight, preferably from 52 to 58% by weight, of the trifunctional oligomer A, from 5 to 15% by weight, preferably from 8 to 12% by weight, of the trifunctional monomer B, and from 5 to 15% by weight, preferably from 8 to 12% by weight, of the difunctional monomer C. The amount of the colorant pigment within the acrylate coating compositions of preferred embodiments depends on the nature of the material used. In the case of carbon black as colorant pigment, for example, preference is given to from 2 to 7% by weight, whereas in the case of $TiO_2$ preference is given to from 15 to 40% by weight, particularly from 22 to 28% by weight. The trifunctional oligomer A, the trifunctional monomer B and the difunctional monomer C are also hereinafter termed component A, component B and, respectively, component C. Surprisingly, it has been found that compositions which comprise components A, B and C and the colorant pigment in the amount stated give cured acrylate coating compositions that are particularly heat-resistant.

The present invention provides laser-inscribable films comprising a contrast layer based on a cured acrylate coating composition and, arranged above the contrast layer, an engraving layer, where the cured acrylate coating composition is based on a composition comprising from 30 to 80% by weight of a trifunctional oligomer A, from 0 to 20% by weight of a trifunctional monomer B, from 1 to 30% by weight of a difunctional monomer C, and from 2 to 40% by weight of a colorant pigment. In one preferred embodiment of the present invention, the composition on which the acrylate coating composition is based comprises from 50 to 60% by weight, preferably from 52 to 58% by weight, of the trifunctional oligomer A, from 5 to 15% by weight, preferably from 8 to 12% by weight, of the trifunctional monomer B, and from 5 to 15% by weight, preferably from 8 to 12% by weight, of the difunctional monomer C and from 2 to 40% by weight of the colorant pigment. In one particularly preferred embodiment of the invention, the composition on which the acrylate coating composition is based comprises from 2 to 7% by weight of carbon black as colorant pigment. In another, likewise preferred, embodiment, the composition on which the acrylate coating composition is based comprises from 15 to 40% by weight, particularly preferably from 22 to 28% by weight, of $TiO_2$ as colorant pigment.

The engraving layer involves a layer which has been arranged above the contrast layer and which can be inscribed with the aid of a single laser beam or with the aid of a plurality of laser beams. In this inscription procedure, the engraving layer is ablated at the sites onto which a laser beam with appropriate energy is directed. If energy input is sufficient, the engraving layer is locally entirely removed, thus being permeable to light at the said sites. It is likewise conceivable that the engraving layer is merely partially ablated at some sites, thus giving the engraving layer an opaque appearance at the said sites. The engraving layer is preferably a coating layer which can be applied by means of printing processes. Preferred examples of appropriate printed coating layers comprise printed coatings based on acrylate coatings which are electron-beam-curable or UV-curable. In an alternative embodiment of the invention, the engraving layer is composed of a thin metal layer. The thickness of the engraving layer is preferably from 1 to 30 µm, preferably from 1 to 20 µm, particularly preferably from 1 to 10 µm. If the thickness of the engraving layer is within this range, it is possible to provide a particularly heat-resistant laser-inscribable film. The thickness of the contrast layer is preferably from 20 to 300 µm, preferably from 40 to 200 µm, particularly preferably from 60 to 150 µm, and when the engraving layer is compared with that layer its thickness is preferably by way of example 10% of the thickness of the contrast layer, or less.

The contrast layer of films according to the invention comprises a cured acrylate coating composition which is based on a composition comprising from 30 to 80% by weight, preferably from 50 to 60% by weight, particularly preferably from 52 to 58% by weight, of a trifunctional oligomer A, from 0 to 20% by weight, preferably from 5 to 15% by weight, particularly preferably from 8 to 12% by weight, of a trifunctional monomer B, from 1 to 30% by weight, preferably from 5 to 15% by weight, particularly preferably from 8 to 12% by weight, of a difunctional monomer C, and from 2 to 40% by weight of a colorant pigment. The contrast layer of films according to the invention can be provided by curing a composition comprising components A, B and C, and comprising the colorant pigment. To this end, the composition is crosslinked by means of UV radiation, electron-beam curing (hereinafter EBC) or thermally. Crosslinking by means of EBC is preferred.

The contrast layer of films according to the invention comprises at least one colorant pigment. For the purposes of the present invention, colorant pigments comprise, without restriction, all of the colorant pigments which are used as colorants and/or brighteners in paints and coatings. Examples of colorant pigments are the rutile form of titanium dioxide ("TiO$_2$", for example rutile grades from Kronos), pigment blacks (for example Printex grades from Evonik) and other colorant pigments known to the person skilled in the art, as cited by way of example in Lehrbuch der Lacke and Beschichtungen [Textbook of coatings] Volume 5 (Hans Kittel and Jürgen Spille, Hirzel Verlag (Stuttgart), 2003). It is preferable that the colorant pigment involves pigments having maximum weathering resistance. The rutile form of titanium dioxide is particularly preferred for the contrast layer. The essential factor for the invention is not the colour of the pigment or of the contrast layer per se, but the resultant colour difference or contrast in comparison with the engraving layer. The pigment used according to the invention serves here to establish the contrast which is produced between the contrast layer and the engraving layer after inscription of the film, i.e. after ablation of the engraving layer by means of the laser.

The trifunctional oligomer A is an oligomer having three unsaturated (meth)acrylate units per molecule, the number-average molar mass Mn of which (determined by means of GPC, calibration with polystyrene standard) is preferably from 1000 to 5000 g/mol; preferably from 1400 to 3600 g/mol, preferably from 1800 to 2200 g/mol, particularly preferably from 1900 to 2100 g/mol. If the molecular weight Mn is in the range mentioned, there is a resultant favourable effect on the long-term heat resistance of the cured acrylate coating composition, and it is thus possible to obtain particularly dimensionally stable contrast layers.

In one preferred embodiment, the trifunctional oligomer A is one selected from the group of the polyurethane tri(meth)acrylates and polyester tri(meth)acrylates, among which particular preference is given to polyurethane tri(meth)acrylates. The expression (meth)acrylate comprises acrylates, methacrylates and mixtures of these. It is preferable that the trifunctional oligomer A involves a polyurethane tri(meth)acrylate, particularly a polyurethane triacrylate. Polyurethane tri(meth)acrylates are oligomers having respectively three unsaturated (meth)acrylate groups per molecule, and also having a plurality of, i.e. at least two, urethane units. Examples of preferred polyurethane triacrylates are the aliphatic urethane triacrylates CN9260D75® and CN9278D80® from Sartomer, among which particular preference is given to CN9260D75®.

The trifunctional monomer B comprises three unsaturated (meth)acrylate units per molecule and in one preferred embodiment of the invention its molar mass is from 300 to 1000 g/mol, preferably from 350 to 800 g/mol, preferably from 350 to 600 g/mol, particularly preferably from 400 to 450 g/mol. Component B is preferably selected from the group consisting of propoxylated and ethoxylated glycerol tri(meth)acrylates and propoxylated and ethoxylated trimethylolpropane tri(meth)acrylates of the general formula (I) or mixtures thereof:

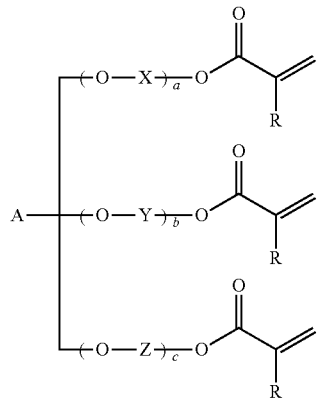

Formula I where R in formula I is hydrogen or a methyl group; A is hydrogen or an ethyl group; X, Y and Z are respectively mutually independently a propylene unit or ethylene unit; and a, b and c are respectively mutually independently an integer from 1 to 4, preferably from 1 to 3, and a+b+c is a number from 3 to 12, preferably from 3 to 9. In one particularly preferred embodiment of the invention, X, Y and Z are propylene units. It is particularly preferable that the trifunctional monomer is a propoxylated glycerol triacrylate. If the selection of the trifunctional monomer B is such that the molecular weight is within the abovementioned ranges and/or is such that the monomer B is covered by the abovementioned formula I, then component B also has a favourable effect on the heat resistance of the contrast layer and therefore of the laser-inscribable film.

The difunctional monomer C is a monomer having two unsaturated acrylate units per molecule. The molar mass of component C is preferably from 100 to 1000 g/mol, preferably from 180 to 350 g/mol, particularly preferably from 220 to 280 g/mol, and component C is preferably one selected from the group of the ethylene glycol diacrylates of the general formula (II):

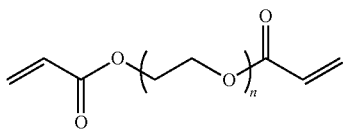

Formula II and the propylene glycol diacrylates of the general formula (III)

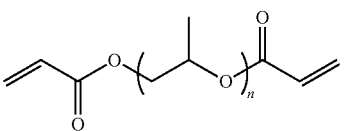

Formula III or mixtures of these, where n in the formulae II and III is respectively mutually independently an integer from 1 to 15, preferably from 1 to 9, particularly preferably from 2 to 6 and very particularly preferably 3 or 4. In one particularly preferred embodiment of the present invention, the difunctional monomer C is triethylene glycol diacrylate. If the selection of the difunctional monomer C is such that the molecular weight is covered by the abovementioned ranges and/or such that the monomer C is covered by the abovementioned formula II or III, component C then also exerts a favourable influence on the heat resistance of the contrast layer and therefore of the laser-inscribable film.

In one particularly preferred embodiment of the invention, the contrast layer is based on a composition comprising at least one polyurethane triacrylate, preferably CN9260D75® or CN9278D80® from Sartomer as component A, a propoxylated glycerol triacrylate of the formula I given above as component B, triethylene glycol diacrylate as component C, and a pigment, for example the rutile form of titanium dioxide.

In another embodiment of the invention, the laser-inscribable film according to the invention has an adhesive-mass layer, preferably a pressure-sensitive-adhesive-mass layer, below the contrast layer. This permits easy further processing of the film, e.g. in cutting or punching processes to give labels, which are likewise provided by the present invention. If the laser-inscribable film according to the invention has an adhesive-mass layer, a punching or cutting step can be used to obtain labels which can per se themselves be applied directly to various substrates, without any requirement that these, in further-processed form, undergo a further coating step. Pressure-sensitive-adhesive masses that can be used are any of the typical adhesive masses which have high adhesion and high grab, in particular acrylate adhesive masses, e.g. resin-modified acrylate adhesive masses, natural rubber adhesive masses and synthetic rubber adhesive masses.

There are various possible ways of producing laser-inscribable films according to the invention. In one preferred embodiment, however, the present invention provides processes for producing laser-inscribable labels which comprise the following steps:
i) providing a supportive film;
ii) applying the engraving layer to the supportive film;
iii) applying an acrylate coating composition comprising components A, optionally B, and C and the colorant pigment to the engraving layer;
iv) curing the acrylate coating composition in order to obtain a contrast layer;
v) optionally applying an adhesive composition to the contrast layer, and also covering the adhesive composition with a release paper or similar release liner;
vi) and removing the supportive film.

Supportive film used in the said process, and also termed process liner, can comprise conventional films based on various materials, such as polyethylene terephthalate (PET). Conventional printing and coating processes can be used to apply not only the engraving layer to the supportive film but also the acrylate coating composition to the engraving layer. In one preferred embodiment of the invention, the acrylate coating composition is applied by means of a comma bar.

Surprisingly, it has been found that laser-inscribable films that can be produced by the process described and that comprise a contrast layer based on the acrylate coating composition described according to the invention have increased long-term heat resistance when compared with known films and labels of the prior art. The said increased long-term heat resistance is apparent in suppressed edge-lift of the films and labels which have been applied by means of an adhesive mass to a substrate, and also in reduced susceptibility to cracking on long-lasting exposure to heat after adhesive-bonding to the substrate. Surprisingly, films and labels according to the invention exhibit not only improved heat resistance but also exceptional tamper prevention, since, despite their heat resistance, they fracture in the region of the contrast layer in the event of a tampering attempt, e.g. during an attempt at separation after adhesive-bonding to a substrate. The said fracture is externally visible in the form of clearly discernible cracking. The labels according to the invention therefore provide a warning of tampering attempts only when such attempts have actually occurred.

An example is used below for further explanation of the invention. Unless otherwise stated, all quantitative data in the examples below are parts by weight, based on the entire composition.

Production of Samples

In order to produce samples of laser-inscribable films in examples 1 to 4 below, a polyester film of thickness 50 μm acting as supportive backing film was first printed with Flexocure Gemini (black) from Flint on a UV flexographic printer from SMB at a web speed of 15 m/min, to produce an engraving layer, where the print height was from 2 to 4 μm. The resultant coating was then UV-cured by using an E 70-2 (4)x1 BLK-2-SLC from IST Metz GmbH mercury tube source, to produce the engraving layer. The tube source operated at 80 W/cm.

In order to produce the contrast layer, the raw materials stated in the examples were combined in a Dispermat (CN10 dissolver from VMA Getzmann) with water-cooled dispersion container (capacity 1 l) and a 60 mm dissolver disc, and homogenized for 20 minutes at 8000 rpm at a temperature of 40° C. The resultant composition was applied at a layer thickness of 100 μm by means of a doctor to the engraving layer and crosslinked by electron-beam curing at 80 kGy and 240 kV to give the contrast layer.

The resultant composite made of supportive backing film/engraving layer/contrast layer was applied to an acrylate pressure-sensitive-adhesive mass of thickness 40 μm equipped on one side with a release liner, and then the supportive polyester backing film was peeled away. The pressure-sensitive-adhesive mass comprised a resin-modified acrylate adhesive mass composed of 80% by weight of an acrylate copolymer and 20% by weight of terpene-phenol resin. The copolymer was obtained by polymerizing 47.5% by weight of n-butyl acrylate, 47.5% by weight of 2-ethylhexyl acrylate, 2% by weight of glycidyl methacrylate and 1% by weight of acrylic acid.

By using a 50D Nd:YAG solid-state laser from Rofin, the resultant film was inscribed with a test inscription and a bar code, and the film was cut to give labels measuring 3×8 cm, again by using the said laser.

Test Methods

In order to determine heat resistance and tamper prevention, five labels were studied, obtained respectively from the samples according to Examples 1 to 4. The procedure here was as follows:

Heat Resistance:

The laser label is adhesive-bonded, with avoidance of air inclusions, to a steel plate of thickness 1 mm, the entire surface of which has been coated with a solvent-based acrylate coating (clear coat) from Kansai Paint (KINO 1210TW-2). After a waiting time of about 24 hours at room temperature, the sample is placed into storage at 150° C. for a period of 2300 h.

At the end of the storage time, the sample is examined for edge-lift (separation of the edges of the label from the substrate in mm—measured from the periphery of the label) and for the number of cracks in the label. The shrinkage of the specimens is also measured (in % of the original adhesive-bonding area).

The results are stated as average of five samples and classified on a scale from 1 to 6.

A value of 1 here means that edge-lift is less than 0.1 mm and shrinkage is less than 0.5%; and no cracks are visible;
a value of 2 here means that edge-lift is less than 0.5 mm and shrinkage is less than 2%; and no cracks are visible; however, the extent of edge-lift, shrinkage and/or cracking is sufficiently great that a value of "1" has not been achieved;
a value of 3 here means that edge-lift is less than 2.0 mm and shrinkage is less than 5%; and at most 2 cracks are visible; however, the extent of edge-lift, shrinkage and/or cracking is sufficiently great that a value of "2" has not been achieved;
a value of 4 here means that edge-lift is less than 5.0 mm and shrinkage is less than 10%; and at most 5 cracks are visible; however, the extent of edge-lift, shrinkage and/or cracking is sufficiently great that a value of "3" has not been achieved;
a value of 5 here means that the label separates completely from the substrate ("maximum edge-lift") and shrinkage is 10% or more; and up to 10 cracks are visible;
a value of 6 here means that the label separates completely from the substrate ("maximum edge-lift") and shrinkage is 10% or more; and more than 10 cracks are visible.

Tamper Prevention:

The tamper prevention ("tamper evidence") test examines the susceptibility of the sample to fracture after adhesive bonding, with avoidance of air inclusions, on a steel plate of thickness 1 mm, the entire surface of which has been coated with clear coat from Kansai Paint (KINO 12107W-2). In this test, after a waiting time of 24 hours after the sample has been adhesive-bonded, with avoidance of air inclusions, to the steel plate, an attempt is made to peel it away from the substrate. The tamper prevention provided by the laser label material is classified into four grades ("1" to "4"). The test identifies the means of assistance required to peel the security label away from the substrate without damage. "Damage" in this context indicates fracture of the label and cracking within the contrast layer.

A value of 4 here means that the label can be peeled away manually without additional means of assistance and without damage; tamper prevention is therefore inadequate;
a value of 3 here means that the label cannot be peeled away manually without damage but it can be peeled away with the aid of a sharp metal blade; tamper prevention is therefore likewise inadequate;
a value of 2 here means that the label cannot be peeled away without damage, even with the aid of a sharp metal blade as sole additional means of assistance; however, it can be peeled away without damage by using isopropanol as solvent in combination with a sharp metal blade; tamper prevention is classified as adequate;
a value of 1 here means that the label cannot be peeled away without damage even by using isopropanol as solvent in combination with a sharp metal blade; tamper prevention in this case is classified as good.

EXAMPLE 1

| 60 parts | Ebecryl 284 ® | Difunctional urethane acrylate (oligomer) from Cytec (comprising about 12% of HDDA), $M_n$ 1200 g/mol |
| 4 parts | Laromer HDDA ® | Difunctional acrylate (reactive diluent) from BASF Hexanediol diacrylate, $M_n$ 226 g/mol |
| 11 parts | SR272 ® | Difunctional acrylate (reactive diluent) from Sartomer Triethylene glycol diacrylate, $M_n$ 258 g/mol |
| 25 parts | Kronos 2160 ® | Titanium dioxide |

EXAMPLE 2

| 56 parts | Genomer G4312 ® | Trifunctional urethane acrylate (oligomer) from Rahn, $M_n$ 1200 g/mol |
| 10 parts | SR 350 ® | Trifunctional methacrylate (reactive diluent), from Sartomer Trimethylolpropane trimethacrylate, $M_n$ 338 g/mol |
| 8 parts | SR 306 ® | Difunctional acrylate (reactive diluent) from Sartomer Tripropylene glycol diacrylate, $M_n$ 300 g/mol |
| 25 parts | Kronos 2160 ® | Titanium dioxide |

EXAMPLE 3

| 70 parts | PEA 03-849 ® | Trifunctional polyester acrylate (oligomer) from Rahn, $M_n$ 1700 g/mol |
| 5 parts | SR 272 ® | Difunctional acrylate (reactive diluent) from Sartomer Triethylene glycol diacrylate, $M_n$ 258 g/mol |
| 25 parts | Kronos 2160 ® | Titanium dioxide |

EXAMPLE 4

| 55 parts | CN 9260 ® | Trifunctional urethane acrylate (oligomer) from Sartomer, $M_n$ 2000 g/mol |
| 10 parts | SR9020 ® | Trifunctional acrylate (reactive diluent) from Sartomer |

| | | Propoxylated glyceryl triacrylate, $M_n$ 428 g/mol |
|---|---|---|
| 10 parts | SR 272 ® | Difunctional acrylate (reactive diluent) from Sartomer |
| | | Triethylene glycol diacrylate, $M_n$ 258 g/mol |
| 25 parts | Kronos 2160 ® | Titanium dioxide |

Results

| Test method | Example 1 | Example 2 | Example 3 | Example 4 |
|---|---|---|---|---|
| Heat resistance | 4 | 2 | 1 | 1 |
| Tamper prevention | 3 | 2 | 2 | 1 |

The samples (Examples 2, 3 and 4) according to the invention exhibit excellent heat resistance over long periods together with adequate to good tamper prevention. In contrast to this, the use of a difunctional urethane acrylate as oligomer leads to markedly poorer heat resistance and to inadequate tamper prevention (Example 1).

Gel permeation chromatography (GPC) was used to determine the number-average molecular weights $M_n$ and the weight-average molecular weights $M_w$. The eluent used comprised THF (tetrahydrofuran) with 0.1% by volume of trifluoroacetic acid. The measurement was made at 25° C. The preliminary column used comprised a PSS-SDV, 5µ, $10^3$ Å, ID 8.0 mm×50 mm. The separation columns used comprised PSS-SDV, 5µ, $10^3$, $10^5$ and $10^6$ with in each case ID 8.0 mm×300 mm. Specimen concentration was 4 g/l, and flow rate was 1.0 ml per minute. The measurement was made against polystyrene standards.

We claim:

1. A laser-inscribable film, comprising
a contrast layer based on a cured acrylate coating composition and
an engraving layer arranged above the contrast layer, wherein the engraving layer is selected from the group consisting of an acrylate-based printed coating and a thin metal layer, and wherein the engraving layer has a thickness of from 1 to 30 µm,
wherein the cured acrylate coating composition is based on a composition comprising
from 30 to 80% by weight of a trifunctional oligomer A, wherein the trifunctional oligomer A is one selected from the group consisting of polyurethane tri(meth)acrylates and polyester tri(meth)acrylates and has a number-average molar mass Mn in a range from 1000 to 5000 g/mol;
from 0 to 20% by weight of a trifunctional monomer B, wherein the trifunctional monomer B has a Mn in a range from 300 to 1000 g/mol and is one selected from the group consisting of propoxylated and ethoxylated glycerol tri(meth)acrylates of general Formula I and mixtures thereof

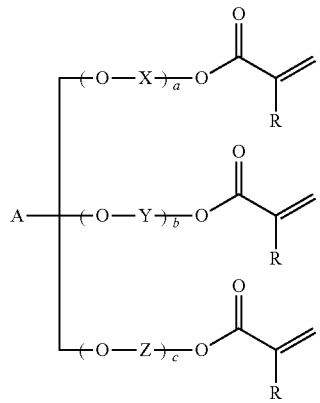

Formula I wherein R in the general Formula I is hydrogen or methyl; A is hydrogen or an ethyl group; X, Y and Z are respectively mutually independently a propylene unit or ethylene unit; and a, b and c are respectively mutually independently an integer from 1 to 4, and a+b+c is a number from 3 to 12, wherein;
from 1 to 30% by weight of a difunctional monomer C;
wherein the difunctional monomer C has a Mn in a range from 180 to 350 g/mol and is one selected from the group of consisting of ethylene glycol diacrylates of general Formula II

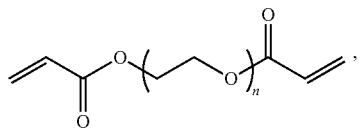

Formula II propylene glycol diacrylates of general Formula III

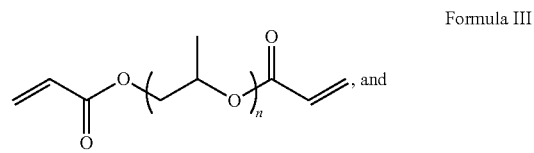

Formula III mixtures thereof,
wherein n in the general formulae (II) and (III) is respectively mutually independently an integer from 1 to 15, and
from 2 to 40% by weight of a colorant pigment.

2. The laser-inscribable film according to claim 1, wherein the composition, on which the acrylate coating composition is based, comprises from 50 to 60% by weight of the trifunctional oligomer A, from 5 to 15% by weight of the trifunctional monomer B, and from 5 to 15% by weight of the difunctional monomer C.

3. The laser-inscribable film according to claim 1, further comprising
an adhesive-mass layer arranged below the contrast layer.

4. The laser-inscribable film according to claim 1, wherein the film is in a form of a label.

5. The laser-inscribable film according to claim 1, wherein the engraving layer consists of the thin metal layer.

* * * * *